July 30, 1935.　　　I. B. LASKOWITZ　　　2,009,780
CENTRIFUGAL VARIABLE THRUST MECHANISM
Filed April 9, 1934　　　2 Sheets-Sheet 1
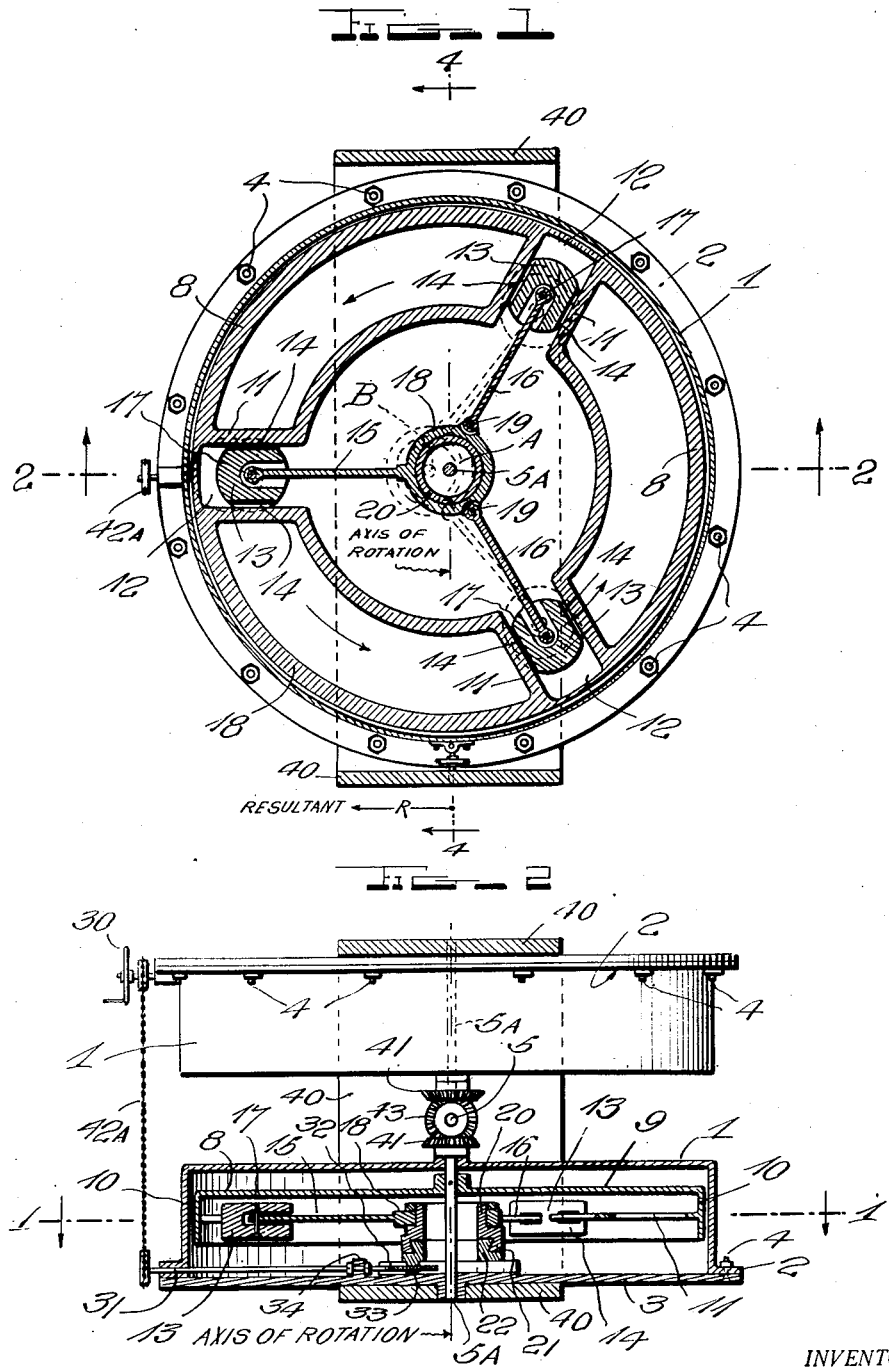
INVENTOR.
Isidor B. Laskowitz
BY
Robert L. Dennison
ATTORNEY.

July 30, 1935.  I. B. LASKOWITZ  2,009,780
CENTRIFUGAL VARIABLE THRUST MECHANISM
Filed April 9, 1934   2 Sheets-Sheet 2
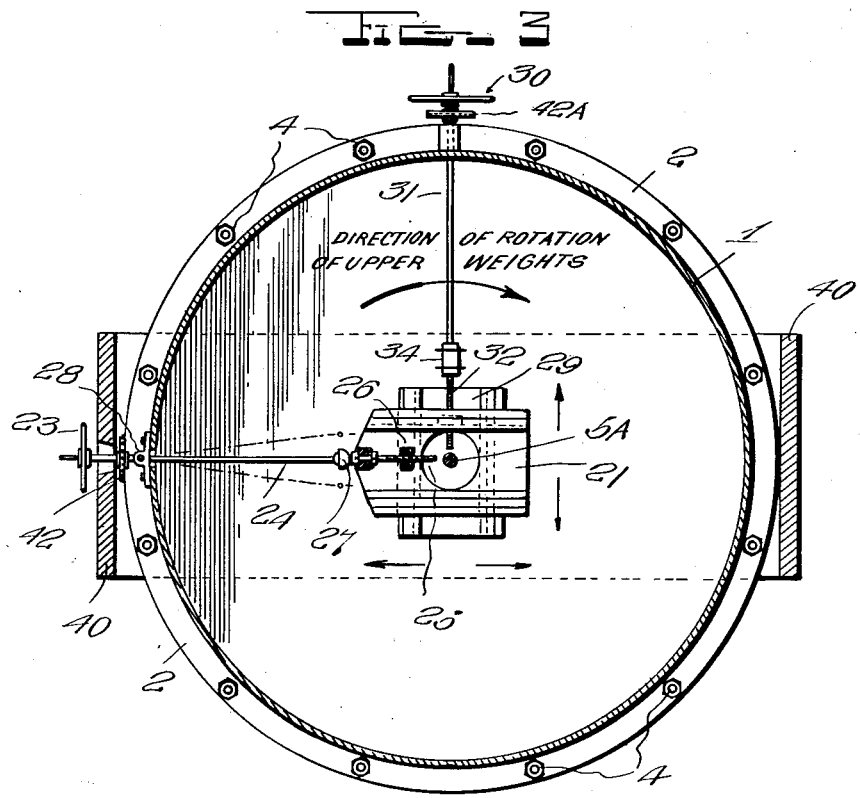
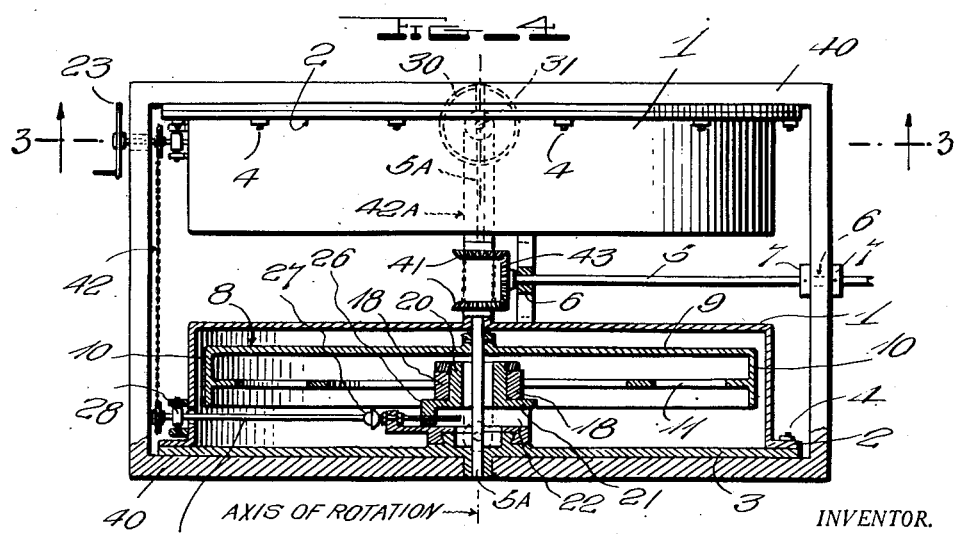
INVENTOR.
*Isidor B. Laskowitz,*
BY
*Robert J. Dennison*
ATTORNEY.

Patented July 30, 1935

2,009,780

UNITED STATES PATENT OFFICE 2,009,780

CENTRIFUGAL VARIABLE THRUST MECHANISM

Isidor B. Laskowitz, Brooklyn, N. Y.

Application April 9, 1934, Serial No. 719,784

20 Claims. (Cl. 74—61)

This application is a continuation in part of my copending application, Serial Number 543,678, filed June 11th, 1931, which eventuated into Patent No. 1,953,964 on April 10, 1934.

The primary object of this invention is to provide a mechanism wherein two sets of weights are caused to rotate in opposite directions, thereby balancing out the reaction torques (including tangential accelerations) and yet be driven by a single power unit.

Another object of this invention is to provide a centrifugal variable thrust mechanism that is compact in arrangement and does not take up as much room as two independently driven centrifugal units.

A further object is to provide a mechanism that is easily controlled and operated for positioning the two sets of oppositely rotated weights where desired, so as to produce an unbalanced resultant thrust which may be utilized as the propelling force and yet said mechanism will have no tendency to rotate about the axis of rotation of the weights.

Other objects and advantages of the present invention will become apparent from the following description when taken in conjunction with the accompanying drawings.

In the accompanying drawings, wherein like reference characters designate corresponding parts throughout the several views:

Figure 1 is a horizontal sectional view through the lower unit taken approximately on the line 1—1 of Figure 2, looking downwardly;

Figure 2 is a partial vertical sectional view taken approximately on the line 2—2 of Figure 1, showing the upper and lower units;

Figure 3 is also a horizontal sectional view taken approximately on the line 3—3 of Figure 4, looking upwardly; and Figure 4 is a view somewhat similar to Figure 2 taken on the line 4—4 of Figure 1, showing the frame and the upper and lower units mounted therein.

In the drawings, wherein for the purposes of illustration is shown the preferred embodiment of my invention, the numeral 1 designates upper and lower spaced circular casings or housings that are each open at one side, outwardly extending flanges 2 being formed around the open ends of the circular casings 1. Removal plates 3 are provided for the open sides of the casings and suitable fastening means shown at 4 extend through the flanges 2 and the perimeters of the removable plates 3 to secure the latter in position. The circular casings with their removal plates 3 are securely held in spaced position in the rigid frame 40 as shown in Figure 4.

Extending centrally through the respective casings 1 and removal plates 3 are the driven shafts 5a having mounted on the inner ends thereof, bevel gears 41 engaging a bevel gear 43 mounted on the inner end of the power shaft 5 which may be driven by a motor, engine or other prime mover (not shown). Suitable bearings for the power shaft 5 are indicated at 6 and for the purpose of preventing axial movement of the power shaft there are arranged on the power shaft, suitable collars 7.

Keyed to the driven shafts 5A for rotation therewith and arranged within the upper and lower circular casings 1 are what may be termed cages denoted generally by the numeral 8. Each cage includes a plate or disc 9 having a turned annular flange 10 at its edge and extending inwardly from the flanges 10 in spaced relation with respect to the plate or disc 9 are the segmental ribs 11, the same being shown more clearly in Figures 1 and 4 of the drawings. These ribs are spaced with respect to each other to provide guideways 12 for the reception of slidable weights 13, the specific construction of which will be hereinafter more fully described.

Upon referring to Figure 1, it will also be observed that the inner edges of the segmental ribs 11 are curved and are spaced a considerable distance away from the driven shafts 5A. The axes of the upper and lower driven shafts 5A coincide, as clearly illustrated in Figures 2 and 4.

The weights 13 are each formed with longitudinal grooves in the opposed sides thereof to accommodate the opposed edges of the respective guideways 12, said grooves being designated by the numeral 14. The inner end portion of each weight is formed with a socket for the reception of the outer end of a connecting rod. In the present instance, there is disclosed three weights and obviously, there are three connecting rods associated with each of the cages, making a total of six weights and six connecting rods for both cages. One of the connecting rods, in each cage, is a master connecting rod and is designated by the numeral 15, the other connecting rods being designated by the numeral 16. The outer ends of all of the connecting rods are pivotally connected to their respective weights by means of pins 17 that extend transversely through the weights and through the inner ends of the sockets as well as through eyes formed at the outer ends of the connecting rods in the manner as also clearly illustrated in Figures 1 and 2.

Rings 18 encircle the upper and lower driven shafts 5A and the inner ends of the master connecting rods 15 are formed integrally with these rings while the inner ends of the other connecting rods 16 are pivotally connected to the rings 18, as at 19.

The rings 18 are coaxially mounted on sleeves 20 that also surround the upper and lower driven shafts 5A, said sleeves being carried by eccentric brackets 21 that are slidably mounted on the brackets 22. The eccentric brackets are capable of being moved radially by rotating the hand wheel 23 secured on the outer end of the upper shaft 24. The rotative motion of the handwheel 23 is transmitted to the lower shaft 24 by means of the chain and sprockets 42 and thus the upper and lower eccentric brackets 21 are capable of being simultaneously moved from side to side by rotating the hand wheel 23. The inner ends of the shafts 24 are threaded as indicated at 25 for co-operation with the internally threaded bosses 26 carried by the eccentric brackets 21.

Suitable collars and bearings are provided to take up the thrust on the shafts or spindles 24 and universal joints 27 are associated with the shafts or spindles 24 to allow for the angularity of movement of the shafts when the bracket members 22 and eccentric brackets 21 are moved transversely as will be presently described. Swivel bearings 28 are also provided for the outer end portions of the shafts or spindles 24 adjacent the chain and sprockets 42 as clearly disclosed in Figures 3 and 4 of the drawings.

The upper and lower brackets 22 are mounted for slidable movement on the ribbed members 29 forming a part of the removable plates 3 and these brackets may be laterally adjusted by operating the hand wheel 30 which rotates the upper one of a pair of shafts or spindles 31 and in turn the lower shaft or spindle 31 by means of the chains and sprockets 42A. The inner ends of these shafts or spindles are threaded as indicated at 32 for co-operation with the internally threaded bosses 33 carried by the brackets 22 as suggested very clearly in Figures 2 and 3 of the drawings. Suitable collars and bearings are also provided to take up the thrust on the shafts or spindles 31 as suggested at 34 in Figure 2.

This arrangement of the upper and lower adjustable brackets will permit the movement of the coinciding axes of the upper and lower eccentric brackets 21, and the sleeves 20 associated therewith, to any other eccentric position in a plane surface away from the common axis of the driven shafts 5A such as for example from "A to B" in Figure 1. The new position is shown in dotted lines in the same figure.

The full line position of the parts show the common axis of the sleeves 20 coinciding with the common axis of the driven shafts 5A as at "A". In this position, when power shaft 5 is rotated the upper and lower driven shafts 5A will be rotated through the bevel gears 41 and 43 in opposite directions, and consequently the weights will be rotated in opposite directions and since they are all spaced at equal distances from the axis of rotation "A" the centrifugal force set up in each weight 13 is the same, also the reaction torques produced by one set of rotating weights is counterbalanced by the other set of rotating weights.

The forces are all in equilibrium and no unbalanced resultant thrust is set up. However, by shifting the common axis of the eccentric brackets 21 and the sleeves 20 associated therewith from position "A" to position "B" it will be observed that the weights 13 have assumed new positions as indicated by the dotted lines and when in this last mentioned position, the radial distances of the weights from the axis of rotation "A" vary. The result is that when the upper and lower sets of weights 13 are rotated in opposite directions, different centrifugal forces are set up in the weights and an unbalanced resultant thrust "R" in the direction shown by the arrow in Figure 1 is set up, tending to move the mechanism and which resultant thrust may be utilized as a propelling force. The effect of the oppositely rotating weights is to balance the reaction torques, including any other forces resulting from tangential accelerations. One half of resultant thrust "R" is produced by the lower set of rotating weights and the other half produced by the upper set of rotating weights. The tangential accelerations herein before referred to, are the accelerations at right angles to the radial accelerations resulting in the radial or centrifugal forces produced.

The axis "B" may be moved to any other position in relation to axis "A" in a plane surface and thus the direction of resultant thrust "R" may be controlled. Furthermore, with the power shaft 5 rotating at a constant rate of speed, it is possible to increase or decrease the intensity of the resultant force "R" by increasing or decreasing the distance of axis "B" from "A". This will be clearly understood from a study of Figure 5 in my pending application (allowed) the principle involved therein, being able to vary the intensity as well as the direction of this resultant thrust applies in this case, except that there is a division of the forces between the upper and lower sets of revolving weights which travel in opposite directions around the axis of rotation.

It will thus be seen from the foregoing description that I have provided new and useful improvements in a centrifugal variable thrust mechanism that may be readily and easily adjusted for accomplishing the desired results. A centrifugal variable thrust mechanism of this character may be used more efficiently and effectively on aircraft, landcraft and water craft and the same will carry out the purposes for which it is designed.

While I have shown the preferred embodiment of the new and useful improvements, it is to be understood that minor changes in the size, shape and arrangement of parts may be resorted to without departing from the spirit of the invention and the scope of the appended claims.

Having thus described the invention, what I claim is:

1. In a variable thrust mechanism, an axis of rotation, a pair of weights oppositely rotatable about said axis and means for causing the weights to assume different positions with respect to the axis of rotation to set up different centrifugal forces and causing an unbalanced resultant thrust to be produced, which may be utilized as a propelling force, the intensity and direction of which may be controlled, while said weights are rotating.

2. In a variable thrust mechanism, an axis of rotation, a pair of weights oppositely rotatable about said axis, and means for causing the weights to assume different positions with respect to the axis of rotation to set up different centrifugal forces and causing an unbalanced resultant thrust to be produced, the intensity of which may be controlled, while said weights are rotating.

3. In a variable thrust mechanism, an axis of rotation, a pair of weights oppositely rotatable about said axis, and means for causing the weights to assume different positions with respect to the axis of rotation to set up different centrifugal forces and causing an unbalanced resultant thrust to be produced, the direction of which may be controlled, while said weights are rotating.

4. In a variable thrust mechanism, an axis of rotation, a pair of weights oppositely rotatable about said axis, and means for causing the weights to assume different positions with respect to the axis of rotation to set up different centrifugal forces and causing an unbalanced resultant thrust to be produced, the intensity and direction of which may be controlled, while said weights are rotating.

5. In a variable thrust mechanism, an axis of rotation, a pair of weights oppositely rotatable about the axis, means for rotating the weights, and additional means for causing the weights to assume different positions with respect to the axis of rotation to set up different centrifugal forces and causing thereby an unbalanced resultant thrust to be produced, the directions and intensity of which may be controlled, while said weights are rotating.

6. In a variable thrust mechanism, a pair of rotatable shafts, the axis of each coinciding with one another, a weight rotatable about one shaft, another weight oppositely rotatable about the second shaft, means for rotating the weights, additional means for shifting the weights with respect to the axes of the rotatable shafts, causing the weights to assume different positions to set up different centrifugal forces and causing an unbalanced resultant thrust to be produced, the direction and intensity of which may be controlled, while said weights are rotating.

7. In a variable thrust mechanism, a pair of rotatable shafts, the axis of each coinciding with one another, a pair of weights oppositely rotatble about their respective shafts and capable of movement in a plane surface, means for rotating the weights, and additional means for shifting the weights to prelocate the axes of the weights with respect to the axes of the rotatable shafts causing the weights to assume definite positions with respect to the common axis of rotation to set up different centrifugal forces and thereby causing an unbalanced resultant thrust to be produced, the direction and intensity of which may be controlled.

8. In a variable thrust mechanism, a pair of rotatable shafts, the axis of each coinciding with one another, a series of interconnected rotatable weights surrounding one shaft, a second series of interconnected rotatable weights surrounding the other shaft, rotating in a direction opposite to that direction in which the weights in the first mentioned series rotate, means for causing the weights to assume different positions and distances with respect to the common axis of rotation of the shafts to set up different centrifugal forces in said weights, causing thereby an unbalanced resultant thrust to be produced, the direction and intensity of which may be controlled.

9. In a variable thrust mechanism, a pair of oppositely rotatable shafts, a unit surrounding each of said shafts and connected thereto for rotation therewith, a series of weights slidably associated with each of said units, rings encircling the shafts and operatively connected to the respective series of weights, and means for moving the rings in a plane surface to shift the position of the weights with respect to said shafts, causing different centrifugal forces to be set up.

10. In a variable thrust mechanism, a pair of oppositely rotatable shafts, a sleeve surrounding each shaft, connecting rods connected at their inner ends to the sleeves at spaced intervals, weights carried by the outer ends of said rods and means for moving the sleeves with the rods and weights connected thereto radially with respect to the shafts to cause the weights to assume different positions and distances from the common axis of rotation, thereby setting up different centrifugal forces.

11. In a variable thrust mechanism, a pair of oppositely rotatable shafts, a sleeve surrounding each shaft, connecting rods connected at their inner ends to the sleeves at spaced intervals, weights carried by the outer ends of said rods, and means for moving the sleeves with the rods and weights connected thereto radially with respect to the shafts to cause the weights to assume different positions and distances from the common axis of rotation, thereby setting up different centrifugal forces, said sleeves being capable of movement in more than one direction.

12. In a variable thrust mechanism, a pair of oppositely rotatable shafts, sleeves surrounding the shafts, connecting rods connected at their inner ends to the sleeves at spaced intervals, weights carried by the outer ends of said rods, means for moving the sleeves with the rods and weights connected thereto radially with respect to the shafts to cause the weights to assume different positions and distances from the axis of rotation, thereby setting up different centrifugal forces, and supporting means for the shiftable weights.

13. In oppositely rotatable shafts having a common axis, sleeves encircling the shafts and spaced therefrom, connecting rods extending radially from the sleeves, weights carried by the outer ends of the rods, supports on which said weights are slidable, and remotely controlled means for moving the sleeves radially to cause the weights to assume different positions and distances from the axis of rotation, thereby setting up different centrifugal forces.

14. In a variable thrust mechanism, a pair of oppositely rotatable shafts having a common axis, sleeves encircling the shafts and spaced therefrom, connecting rods extending radially from the sleeves, weights carried by the outer ends of the rods, supports on which said weights are slidable, and remotely controlled means for moving the sleeves radially to cause the weights to assume different positions and distances from the axis of rotation, thereby setting up different centrifugal forces, said sleeves connecting rods and weights being shiftable in a plane surface in more than one direction.

15. In a variable thrust mechanism, a pair of oppositely rotatable shafts, cages fixedly secured on the shafts, sleeves encircling the shafts and spaced therefrom, connecting rods extending radially from the sleeves for disposition within the cages, weights carried by the outer ends of the connecting rods, supports for the slidable weights in the cages, and means for moving the sleeves radially with respect to the rotatable shafts to cause the weights to assume different positions and distances from the axis of rotation, thereby setting up different centrifugal forces and an unbalanced resultant thrust.

16. In a variable thrust mechanism, a pair of oppositely rotatable shafts, cages fixedly secured on the shafts, sleeves encircling the shafts and spaced therefrom, connecting rods extending radially from the sleeves for disposition within the cages, weights carried by the outer ends of the connecting rods, supports for the slidable weights in the cages, and remotely controlled means for moving the sleeves radially in more than one direction with respect to the rotatable shafts to cause the weights to assume different positions and distances from the axis of rotation of the shafts, thereby setting up different centrifugal forces and an unbalanced resultant thrust.

17. In a variable thrust mechanism, a pair of oppositely rotatable shafts, cages fixedly secured on the shafts, sleeves encircling the shafts and spaced therefrom, connecting rods extending radially from the sleeves for disposition within the cages, weights carried by the outer ends of the connecting rods, supports for the slidable weights in the cages, and remotely controlled means for moving the sleeves radially in more than one direction with respect to the rotatable shafts to cause the weights to assumes different positions and distances from the axis of rotation of the shafts, thereby setting up different centrifugal forces and an unbalanced resultant thrust, said last mentioned means including superposed brackets interconnected and slidable in opposite directions, said sleeves being connected to brackets for movement therewith.

18. In a variable thrust mechanism, a pair of oppositely rotatable shafts, having a common axis, sleeves surrounding the shafts and spaced therefrom, rings encircling the sleeves and rotatable thereon, connecting rods extending radially from the rotatable rings, weights carried by the outer ends of the connecting rods, supporting means for the weights carried by the shafts, the weights being slidable on said supporting means, and additional means for moving the sleeves radially in a plane surface for causing the weights to assume different positions and distances from the axis of rotation, thereby setting up different centrifugal forces and an unbalanced resultant thrust.

19. In a variable thrust mechanism, a pair of oppositely rotatable shafts, having a fixed axis, sleeves surrounding the shafts and spaced therefrom, rings encircling the sleeves and rotatable thereon, connecting rods extending radially from the rotatable rings, weights carried by the outer ends of the connecting rods, supporting means for the weights carried by the shafts, the weights being slidable on said supporting means, and additional means for moving the sleeves radially in a plane surface for causing the weights to assume different positions and distances from the axis of rotation, thereby setting up different centrifugal forces and an unbalanced resultant thrust, said sleeves, and the elements carried thereby being capable of movement in more than one direction.

20. In a variable thrust mechanism, a pair of oppositely rotatable shafts, having a fixed axis, sleeves surrounding the shafts and spaced therefrom, rings encircling the sleeves and rotatable thereon, connecting rods extending radially from the rotatable rings, weights carried by the outer ends of the connecting rods, supporting means for the weights carried by the shafts, the weights being slidable on said supporting means, and additional means for moving the sleeves radially in a plane surface for causing the weights to assume different positions and distances from the axis of rotation, thereby setting up different centrifugal forces and an unbalanced resultant thrust, said last mentioned means including interconnected brackets slidable in opposite directions, said sleeves being carried by said brackets.

ISIDOR B. LASKOWITZ.